(12) United States Patent
Shannon et al.

(10) Patent No.: US 11,865,703 B2
(45) Date of Patent: Jan. 9, 2024

(54) FLEXIBLE MECHANICAL JOINT

(71) Applicant: Sanctuary Cognitive Systems Corporation, Vancouver (CA)

(72) Inventors: Connor Richard Shannon, Vancouver (CA); Hatef Khadivinassab, Vancouver (CA); Matthew Steven Hill, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 117 days.

(21) Appl. No.: 17/111,789

(22) Filed: Dec. 4, 2020

(65) Prior Publication Data

US 2021/0170607 A1    Jun. 10, 2021

Related U.S. Application Data

(60) Provisional application No. 62/943,949, filed on Dec. 5, 2019.

(51) Int. Cl.
*B25J 17/00* (2006.01)
*B25J 11/00* (2006.01)

(52) U.S. Cl.
CPC ............... *B25J 17/00* (2013.01); *B25J 11/00* (2013.01)

(58) Field of Classification Search
CPC . B25J 18/06; B25J 9/0078; B25J 17/00; B25J 11/00; F16C 1/02; F16C 1/04; F16C 1/265; F16C 1/223; F16C 1/22; F16C 1/101; F16C 1/06; F16C 1/106; A61B 1/01
See application file for complete search history.

(56) References Cited

U.S. PATENT DOCUMENTS

| | | | | |
|---|---|---|---|---|
| 8,069,747 B2* | 12/2011 | Buckingham | ............ | B25J 18/06 901/15 |
| 2006/0156851 A1* | 7/2006 | Jacobsen | .................. | B25J 18/06 74/490.01 |
| 2006/0276247 A1* | 12/2006 | Martinez | .................... | F16C 1/02 464/78 |
| 2009/0099420 A1* | 4/2009 | Woodley | .............. | A61B 1/0057 600/142 |
| 2011/0313331 A1* | 12/2011 | Dehez | .................. | A61H 1/0285 601/33 |
| 2013/0298759 A1* | 11/2013 | Rotinat-Libersa | ....... | B25J 15/12 92/90 |

(Continued)

*Primary Examiner* — Gregory Robert Weber
(74) *Attorney, Agent, or Firm* — Thomas Mahon; Adenike Adebiyi

(57) ABSTRACT

A flexible joint includes a plurality of links, a plurality of flexures, and at least one cable which can be tensioned or relaxed to cause a bending about a plurality of axes. The links may include a base link; a last link; and a plurality of intermediate links, coupled together by the flexures such that the plurality of intermediate links, the first link, and the last link form a chain of links having the base link at a first end of the chain and the last link at a second end of the chain and each of the plurality of intermediate links is coupled to two other ones of the plurality of links by two flexures. The cable(s) extend through cable pass-through-holes in the links. The links may comprise disks with sloped faces, and may be rotational offset from another around a longitudinal axis. The flexures may comprise living hinges.

20 Claims, 9 Drawing Sheets

(56) References Cited

U.S. PATENT DOCUMENTS

| | | | | |
|---|---|---|---|---|
| 2013/0312564 A1* | 11/2013 | Kim | ........................ | A61B 34/30 |
| | | | | 901/21 |
| 2014/0260755 A1* | 9/2014 | Dong | ........................ | B25J 9/06 |
| | | | | 74/490.04 |
| 2015/0343649 A1* | 12/2015 | Galinson | .................. | B25J 9/104 |
| | | | | 901/27 |
| 2020/0323599 A1* | 10/2020 | Kim | ........................ | A61B 34/71 |
| 2020/0323600 A1* | 10/2020 | Kurokawa | ............. | A61B 17/29 |
| 2021/0186637 A1* | 6/2021 | Kurokawa | ............. | A61B 17/29 |
| 2021/0370529 A1* | 12/2021 | Kwon | ........................ | B25J 9/10 |

\* cited by examiner

FLEXIBLE MECHANICAL JOINT

FIELD

This disclosure generally relates mechanical joints, for example mechanical joints for use in robotics, and in particular a flexible mechanical joint which may be employed as a neck joint in a robot.

BACKGROUND

Description of the Related Art

Mechanical joints are used to couple parts to one another. Mechanical joints often allow movement of one part with respect to another part, for example providing one or more degrees of freedom for pivoting, rotation or articulation about one or more axes. Mechanical joints come in a large variety of forms, for example a knuckle joint, pin joint, hinge joint, ball and socket joint, or prismatic joint. A suitable mechanical joint is often selected based on a particular application, desired type of movement and/or stress to which the joint will be subjected.

Robots may include one or more joints between parts thereof. For example, robots with moveable robotic appendages may include one or more joints between various links of the moveable robotic appendage which provides one or more degrees of freedom for the moveable robotic appendage.

BRIEF SUMMARY

A flexible mechanical joint may provide multiple degrees of freedom, for example allowing one part to curl about a set of axes that lie in a common plane and that are radially spaced with respect to one another about a common intersection point. The flexible mechanical joint may take the form of a flexible mechanical neck joint which may be used in a robot to mimic a human neck, allowing a robotic head to tilt with respect to a robotic thorax in a fashion similar to a human head. The flexible mechanical joint is composed of a series of links, which may be shaped like disks, the links coupled by a series of flexures that allow the series of disks to curl. The flexures are distributed around a longitudinal axis of the flexible mechanical joint, for instance at 45 degree increments, which allows the flexible mechanical joint to curl in any direction. The flexible mechanical joint is actuated through one or more cables, for instance a set of four cables. The cables may, for example, be distributed at four opposing corners of the links. The cables may be fixed to a last one of the links and pass through a number of throughholes in each of the links. Actuation (e.g., tensioning, relaxing) of the cables controls both a configuration (i.e., amount of curl about one or more axes) and a stiffness of the flexible mechanical joint.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations and embodiments. However, one skilled in the relevant art will recognize that the implementations and embodiments may be practiced without one or more of these specific details, or with other methods, components, structures, materials, etc. In other instances, well-known structures associated with mechanical joints, and actuators (e.g., solenoids, electric motors, electromagnets, pneumatic or hydraulic piston and associated pressure reservoirs and valves) operable to cause articulation of mechanical joints, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "in one implementation" or "in an implementation" or "one embodiment" or "an embodiment" means that a particular feature, structure or characteristic described in connection with the implementation or embodiment is included in at least one implementation or at least one embodiment. Thus, the appearances of the phrases "in one implementation" or "in an implementation" or "in one embodiment" or "in an embodiment" in various places throughout this specification are not necessarily all referring to the same implementation or embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
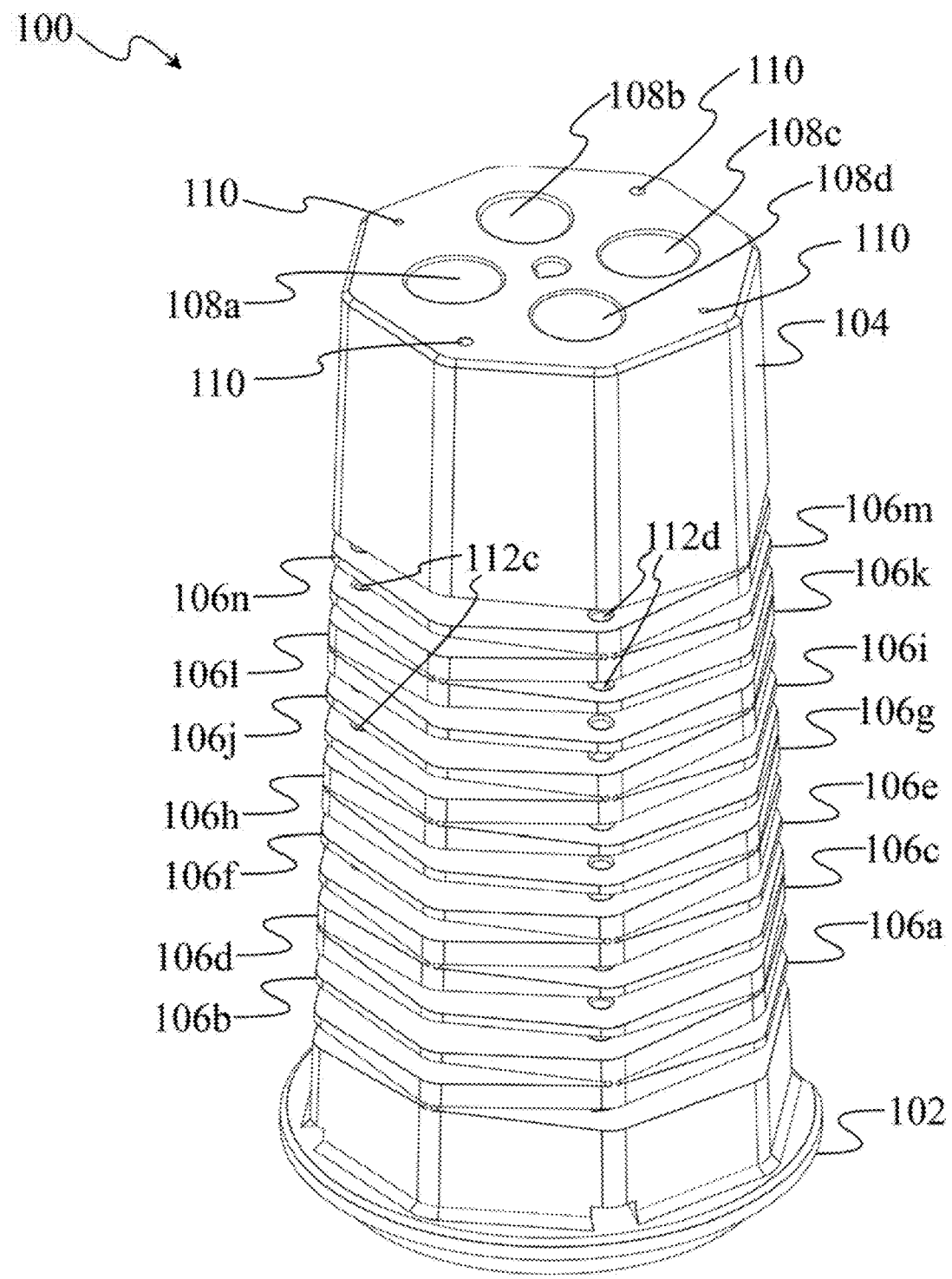
FIG. 1 is a top, left side, rear isometric view of a flexible mechanical joint in the form of a flexible mechanical neck joint according to at least one illustrated implementation, including a set of links and flexures coupling links of respective pairs of the links together, the flexible mechanical joint illustrated in an unarticulated configuration.

FIG. 1 shows a flexible mechanical joint 100 according to at least one illustrated implementation, the flexible mechanical joint 100 illustrated in FIG. 1 in an unarticulated configuration. The flexible mechanical joint 100 may be used to moveably or articulatably couple a robot head to a robot thorax or other portion of a robot, and thus be interchangeably denominated as a flexible mechanical neck joint 100.

The flexible mechanical joint 100 comprises a base or proximate-most link 102, an end or distal-most link 104, and a set of plate or intermediary links 106a-106n (fourteen shown, collectively 106) located between the base or proximate-most link 102 and the end or distal-most link 104. The plate or intermediary links 106a-106n of the set of plate or intermediary links 106 are arrayed with respect to one another, for example in a stack. The plate or intermediary links 106a-106n of the set of plate links 106 may taper in size or dimension, going from relatively larger to relatively smaller as the set is traversed from a proximate end to a distal end of the stack, where the proximate end is an end of the stack (e.g., plate or intermediary link 106a) that is closest to the base or proximate-most link 102 and the distal end is the end of the stack (e.g., plate or intermediary link 106n) that is closest to the end or distal-most link 104. The size or dimension in which the taper occurs may depend on the overall geometry of the plate or intermediary links 106a-106n. For example, the size or dimension may correspond to a measure of a length of a perimeter or boundary of a major face of the plate or intermediary links 106a-106n, a length or width of the plate or intermediary links 106a-106n or of a major face, or an area of a major face of the plate or intermediary links 106a-106n.

The end or distal-most link 104 has a set of cable connection points or cavities 108a-108d (four shown, collectively 108) and a set of end-effector connection features, anchors, or points 110 (four shown). The cable connection points or cavities 108a-108d may be arrayed about a center or longitudinal axis of the end or distal-most link 104; the cable connection points or cavities 108a-108d angularly spaced from one another. The end-effector connection features, anchors, or points 110 may be arrayed about a center or longitudinal axis of the end or distal-most link 104; the end-effector connection features, anchors, or points 110 angularly spaced from one another.

Figure 5:
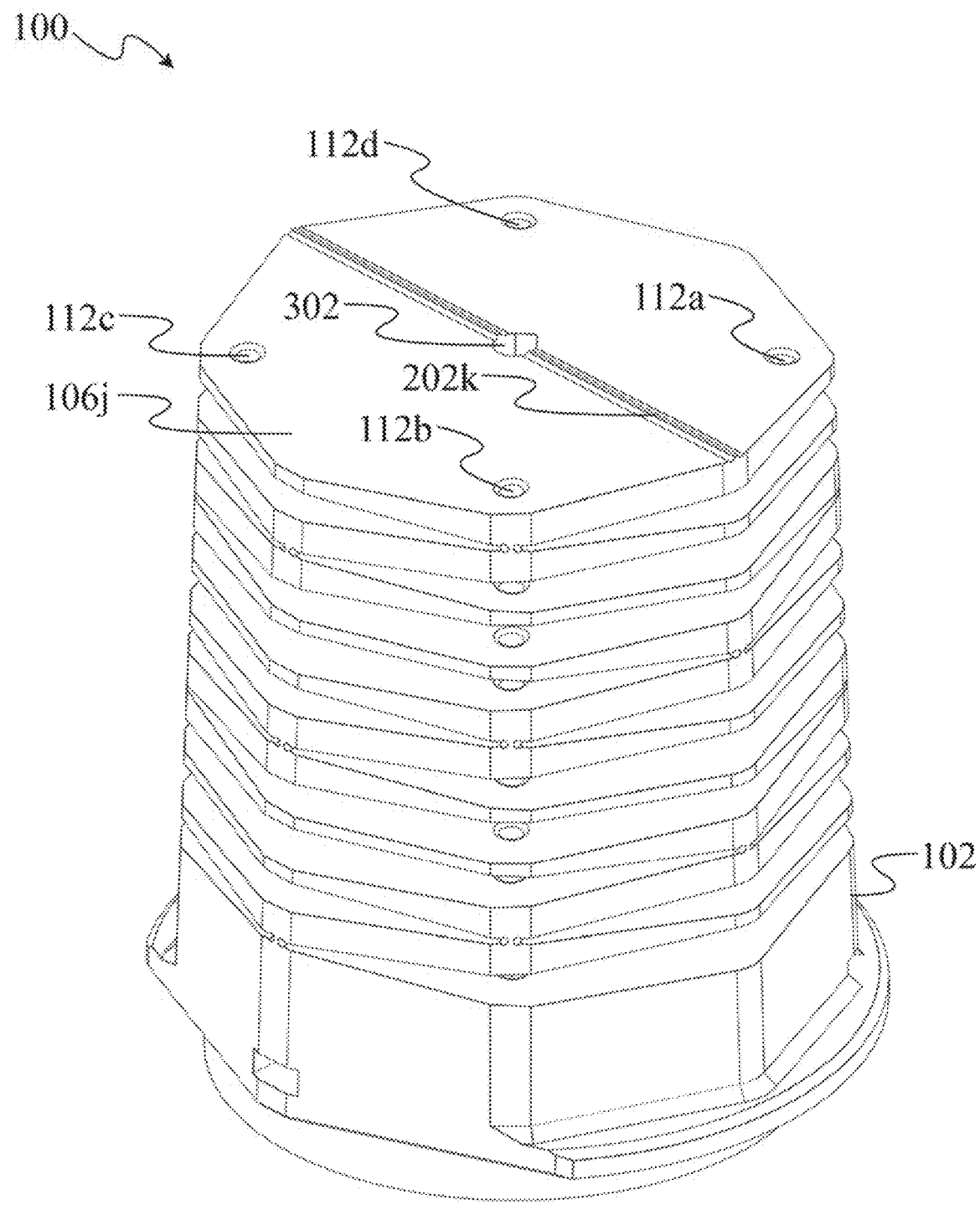
FIG. 5 is a top, right side, front isometric view of a lower portion of the flexible mechanical joint of FIGS. 1 and 2 with several links of an upper portion removed to better illustrate an intermediary one of the links and flexures thereof.
Figure 6A:
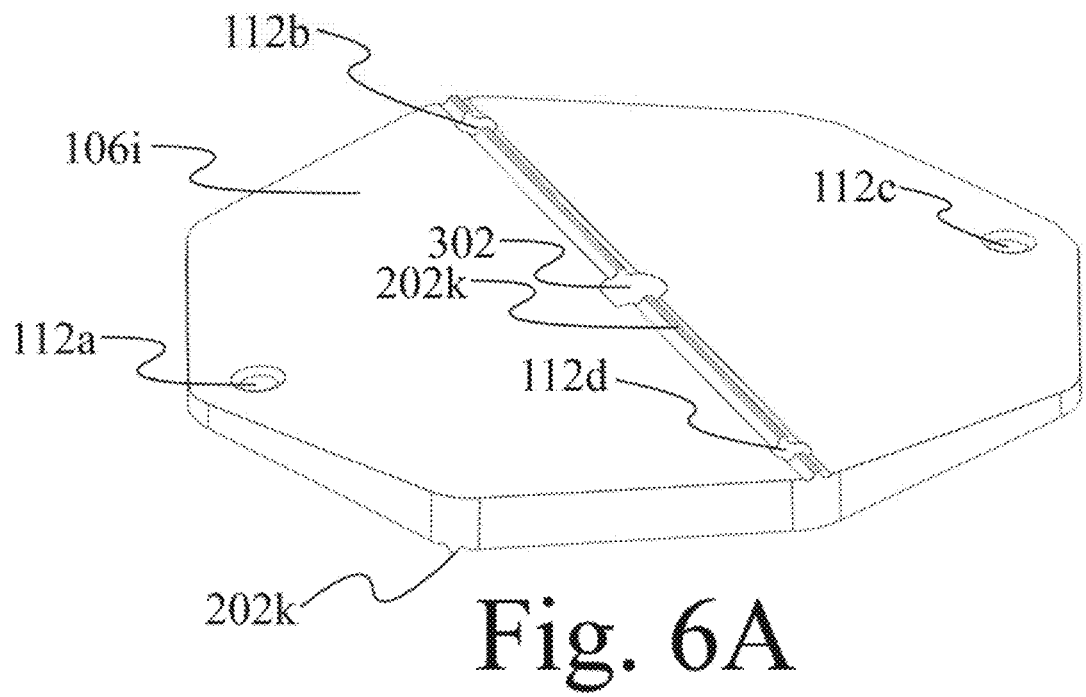
FIG. 6A is an isometric view of one of the links of the flexible mechanical joint of FIGS. 1 and 2, according to at least one illustrated implementation.
Figure 6B:
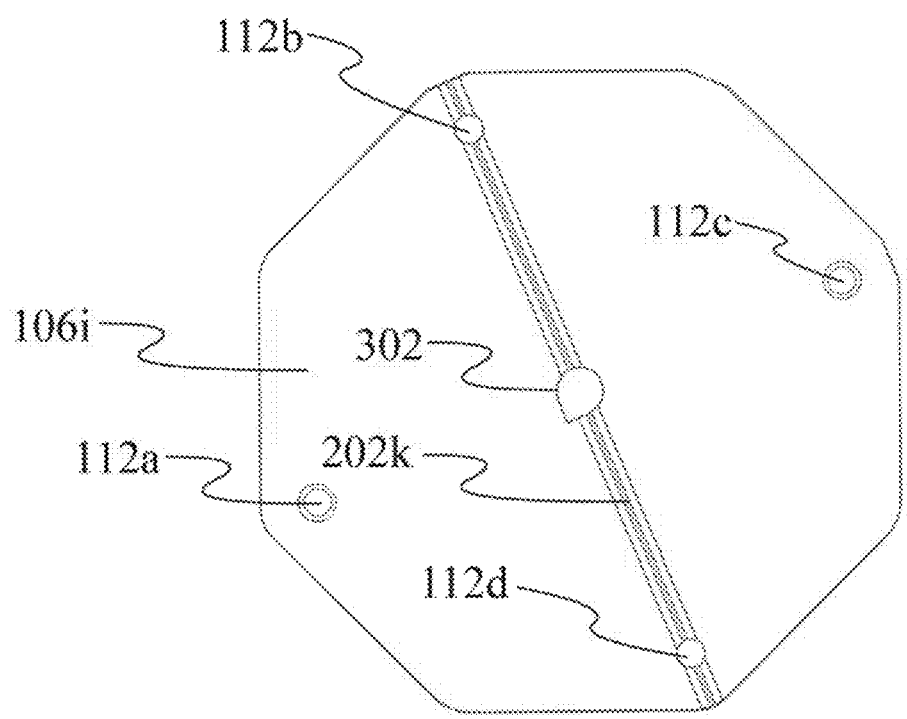
FIG. 6B is a top plan view of the one of the links of FIG. 6A.

As best illustrated in FIGS. 5, 6A and 6B, each of the plate or intermediary links 106a-106n has a respective set of cable pass-through-holes 112a-112d (only a subset is visible in FIG. 1, collectively 112). The pass-through-holes 112a-112d may be arrayed about a center or longitudinal axis of the respective one of the plate or intermediary links 106a-106n; the pass-through-holes 112a-112d angularly spaced from one another. Notably, the plate or intermediary links 106a-106n may be rotationally oriented with respect to one another to generally radially align each of the pass-through-holes 112a-112d with corresponding pass-through-holes 112a-112d on each of the plate or intermediary links 106a-106n. For example, a first pass-through-hole 112a on each of the plate or intermediary links 106a-106n may be aligned with one another about a longitudinal axis when the flexible mechanical joint 100 is in an unarticulated configuration. Additionally, the end link 104 may be rotationally oriented with respect to the plate or intermediary links 106a-106n to generally radially align respective ones of the cable connection cavities 108a-108d with corresponding ones of the pass-through-holes 112a-112d on each of the plate or intermediary links 106a-106n. For example, a first one of the cable connection cavities 108a may be aligned about a longitudinal axis with a first one of pass-through-holes 112a on each of the plate or intermediary links 106a-106n when the flexible mechanical joint 100 is in an unarticulated configuration.

Figure 2:
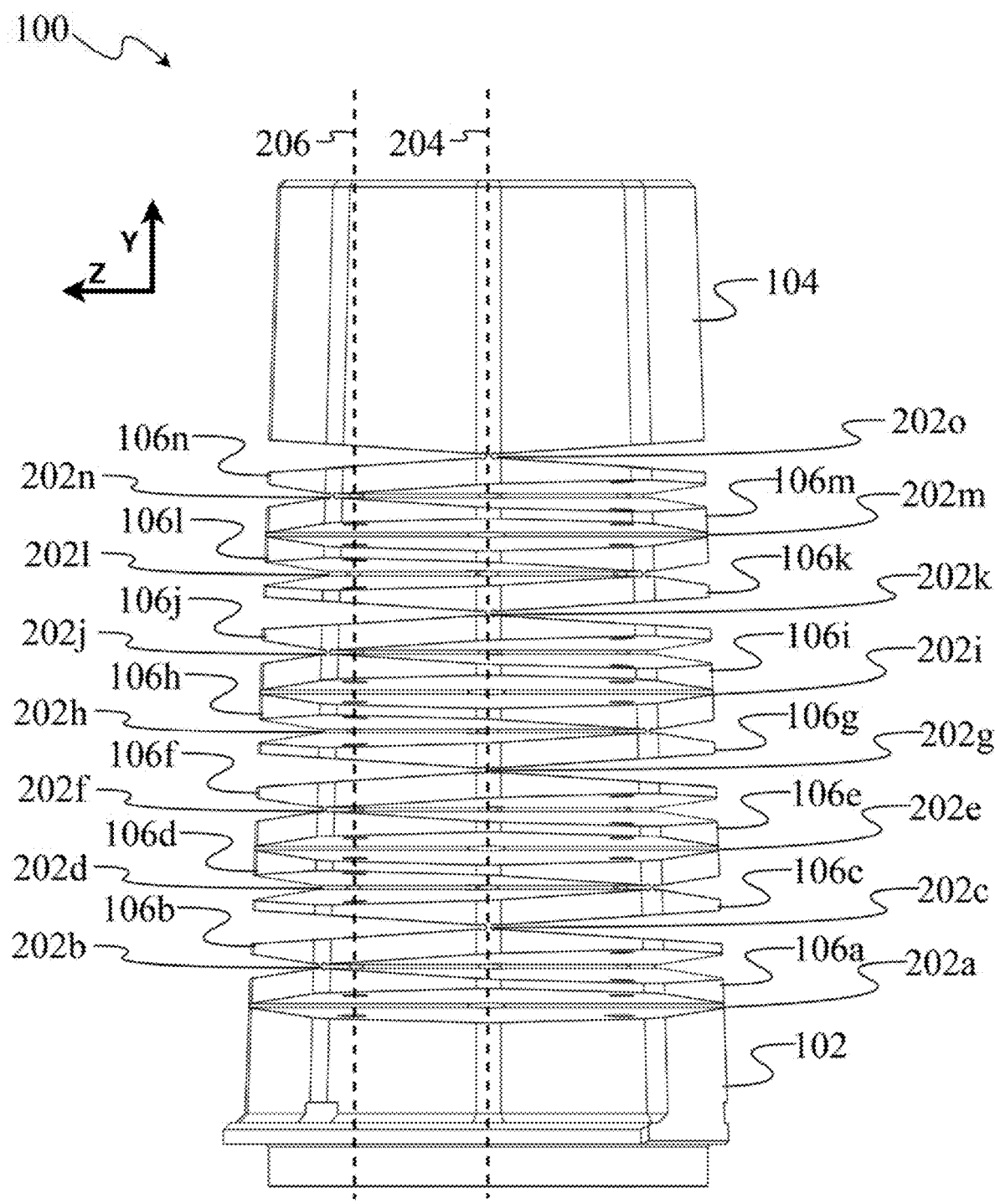
FIG. 2 is a left side elevational view of the flexible mechanical joint of FIG. 1, also illustrated in the unarticulated configuration.

FIG. 2 shows the flexible mechanical joint 100 of FIG. 1, in particular illustrating a plurality of flexures 202a-202o (collectively 202). While fifteen flexures 202 are illustrated the flexible mechanical joint 100 may include a larger or smaller number of flexures 202. A proximate-most flexure 202a couples base link 102 with a first or proximate-most plate link 106a, and a distal-most flexure 202o couples a distal-most plate link 106n with end link 104. Each of a number of intermediate flexures 202b-202n couple together respective plate links 106a-106n of successive pairs plate links 106a-106n. Each of the flexures 202 comprise a thin hinge that allows for rotation of a structure attached to one side relative to the other around an axis of rotation of the flexure 202, the axis of rotation of the flexure being along the link running along a length of the thin hinge of the flexure. The flexures 202 may take the form of living hinges. For example, flexure 202a allows for plate link 106a to rotate with respect to base link 102 around an axis extending along the length of the flexure 202a, which is parallel to the Z-axis. The flexures 202 in this implementation, when in a relaxed or unactuated state, all flexures 202 have a respective axis of rotation that is perpendicular to a Y-axis of the flexible mechanical joint 100, with the flexure 202a having an axis of rotation parallel to the Z-axis and each following flexure having a respective axis of rotation offset from the previous by 45 degrees around the Y-axis. For example, the flexure 202b has an axis of rotation 45 degrees away from the axis of rotation of 202a, the axis of rotation of 202b being pointing the axis pointing half way between the positive X-axis and the positive Z-axis. Due to the incremental rotation of the flexure axes, every fourth flexure (e.g., 202a, 202e, 202l, and 202m, and 202b, 202f, 202j, and 202n) in the illustrated implementation forms a set of flexures having parallel axes of rotation. Each of the plate links 106, base link 102, and end link 104 have sloped or beveled faces that allow for clearance for the rotation around the flexures.

Planes 204 and 206 are indicated in FIG. 2 by the broken lines passing through the flexible mechanical joint 100. The planes 204 and 206 are parallel to the X-Y plane of the flexible mechanical joint 100 and are used to create the cross-sectional views in FIGS. 3, 4, and 8.

Figure 3:
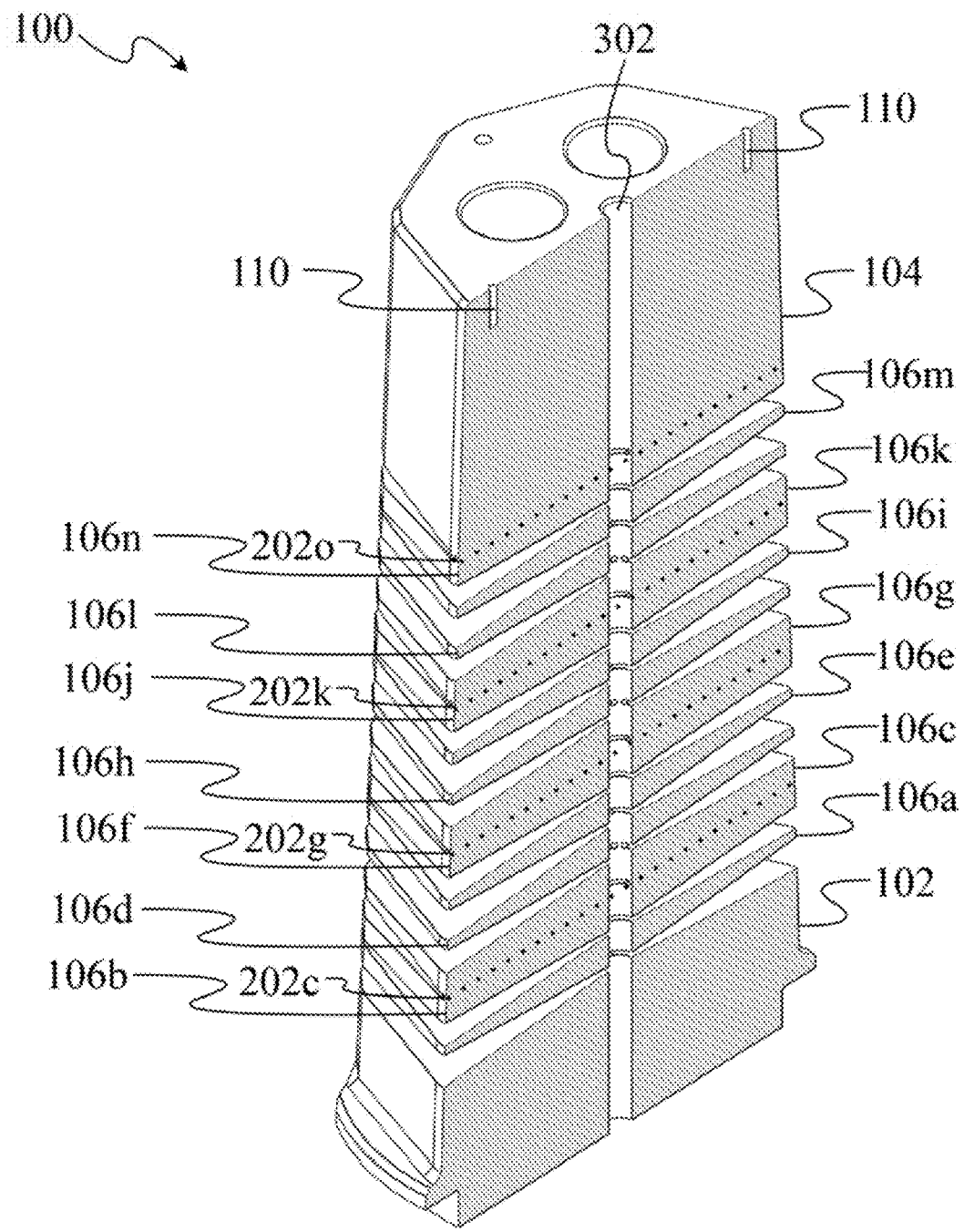
FIG. 3 is a cross-sectional view of the flexible mechanical joint of FIGS. 1 and 2 taken along a section line that passes through a longitudinal axis of the flexible mechanical joint, the flexible mechanical joint illustrated in the unarticulated configuration.

FIG. 3 shows the flexible mechanical joint 100 in cross-section, the cross-sectional view taken along plane 204 through the center of the flexible mechanical joint 100. An inner channel 302 extends along a center or longitudinal axis of the flexible mechanical joint 100. The inner channel 302 provides a conduit or passage for electrical wires, fluid carrying tubing, mechanical cables, or other flexible structures to pass through the inside of the flexible mechanical joint 100. The inner channel 302 extends through every plate link 106 as well as base link 102 and end link 104. Broken lines indicate the axis of rotation of the flexures 202c, 202g, 202k, and 202o that have axis of rotation on plane 204. The plate links 106 on either side of the flexures 202 are connected by a thin hinge section and so the entire flexible mechanical joint 100 is one continuous body. Some implementations may have a spring or similar structure within or around the inner channel 302, which may prevent the mechanism from buckling and may contribute a restoring force to the mechanism.

Figure 4:
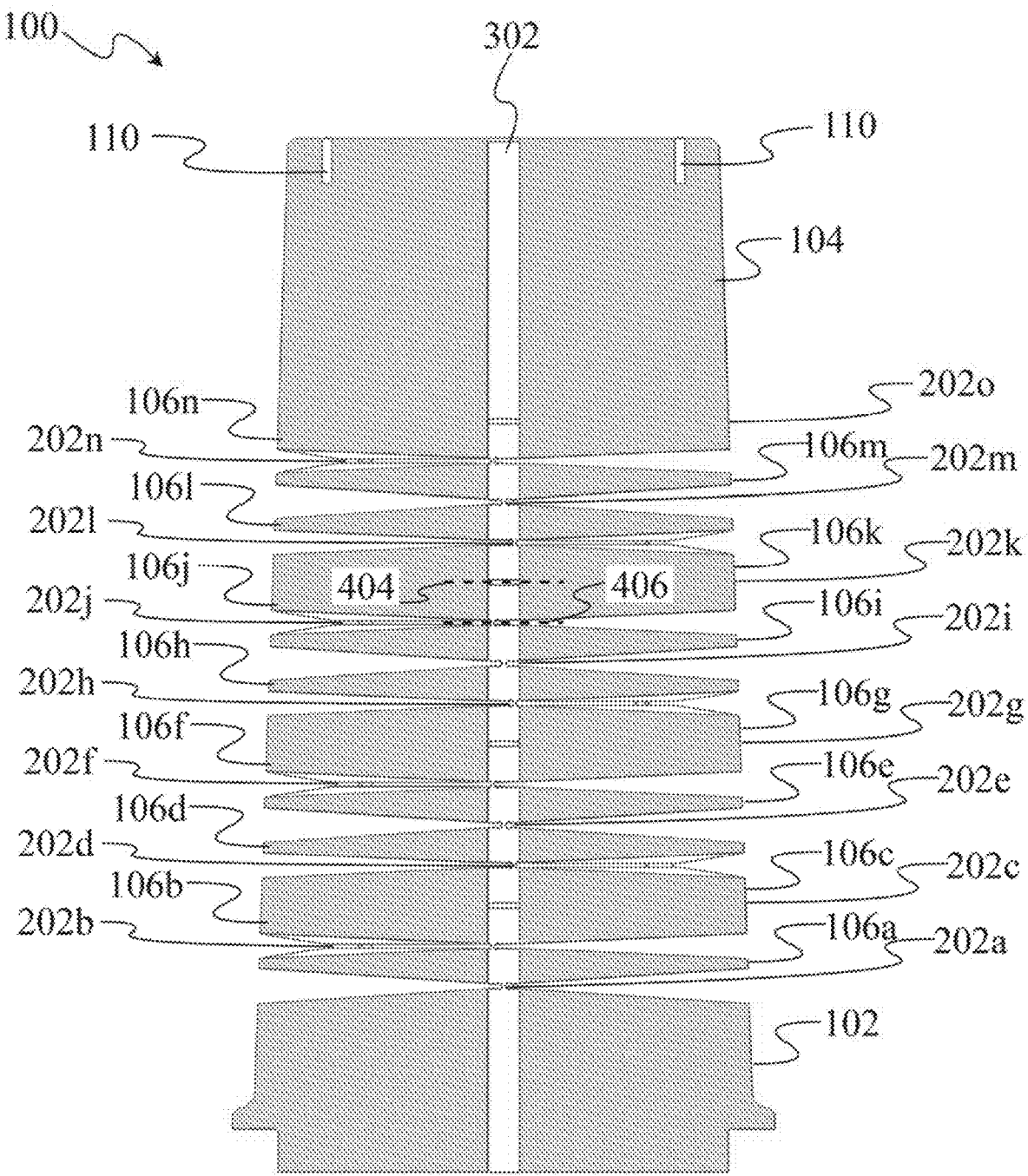
FIG. 4 is a cutaway view of the flexible mechanical joint of FIGS. 1 and 2 taken along the section line that passes through the longitudinal axis of the flexible mechanical joint, the flexible mechanical joint illustrated in the unarticulated configuration.

FIG. 4 shows the flexible mechanical joint 100 in cross-section, the cross-sectional view taken along plane 204 (FIG. 2). FIG. 4 shows all plate links 106 and flexures 202. Planes 404 and 406 are indicated by the broken lines extending through the flexible mechanical joint 100. The planes 404 and 406 are parallel to the X-Z plane of the flexible mechanical joint 100.

FIG. 5 shows a lower portion of the flexible mechanical joint 100 of FIG. 1, better illustrating one of the plate links 106j. FIG. 5 clearly shows a number of cable pass-through holes 112a-112d and the inner channel 302 in plate link 106j, as well as flexure 202k which connects plate link 106j with plate link 106k.

FIG. 6A clearly shows a single plate link 106i of the flexible mechanical joint 100 (FIG. 1) as an example of a plate link.

FIG. 6b depicts a top orthogonal cross-section view of the flexure joint 100 with a cross-section between plane 404 and plane 406. FIG. 6b clearly shows a single plate link 106i of the flexible mechanical joint 100 (FIG. 1) as an example of a plate link.

Figure 7:
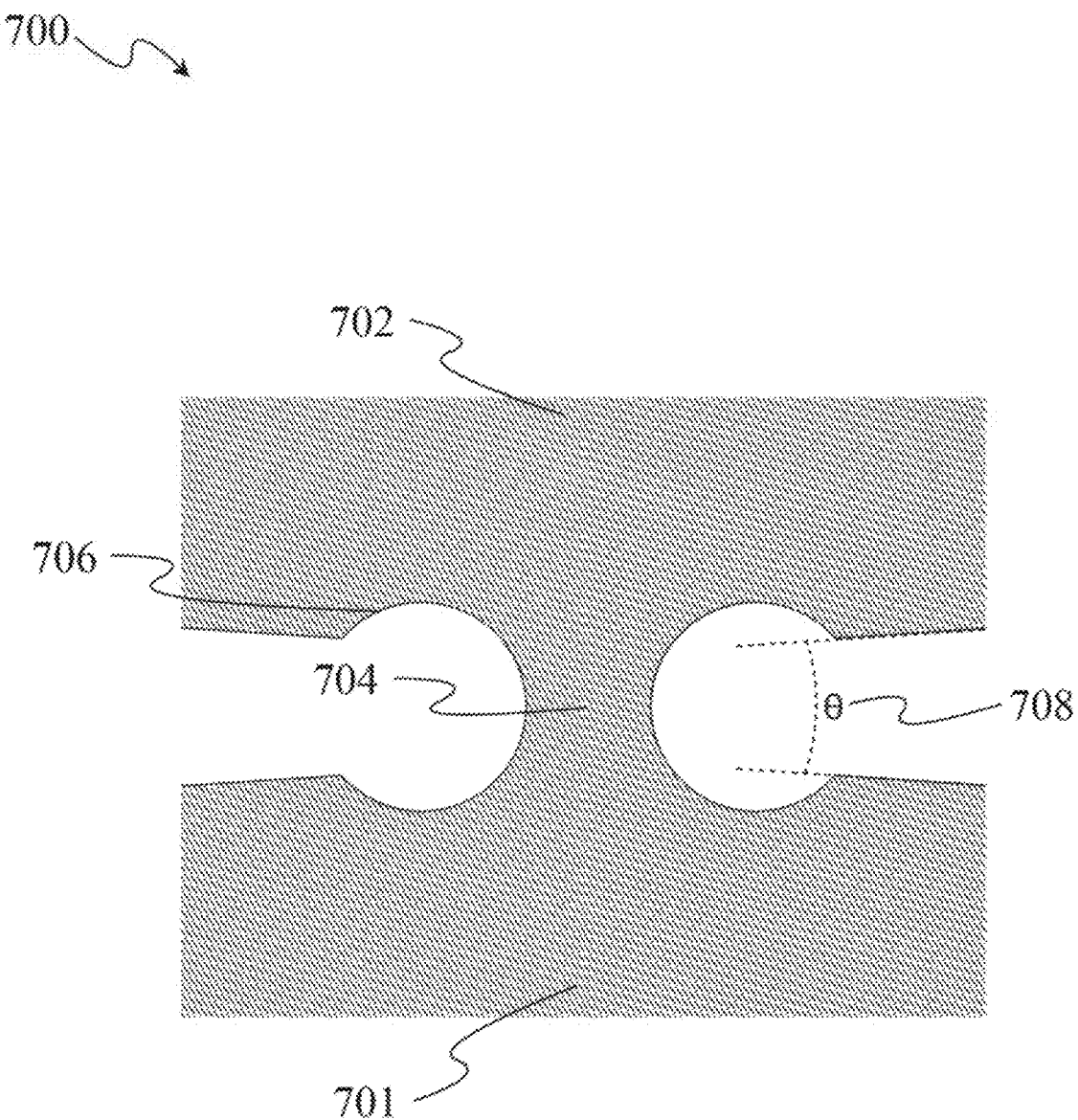
FIG. 7 is a side elevational view of the one of the flexures, according to at least one illustrated implementation.

FIG. 7 shows a flexure 700 that may be used as a joint in an implementation of the flexible mechanical joint 100 (FIG. 1). Flexure 700 links together a first link 701 and a second link 702 by a thin hinge 704. The hinge 704, made of a material (e.g., metal), that allows for repeated rotation of the second link 702 relative to the first link 701 about an axis that extends through a middle of the hinge 704. The hinge 704 may take the form of a living hinge. The flexure 700 may include a pair of opposed circular channels 706 that delineate the hinge 704. The circular or arcuate profile of the channels 706 may advantageously reduce stress on the material of the flexure 700, and provide sufficient room to accommodate rotation of the first link 701 with respect to the second link 702. The flexure 700 may include a pair of opposed slots that delineate the first link 701 from second link 702, the first and the second links 701, 702 having opposed faces that slope away from one another as the slots are traversed from an interior to an exterior thereof, the slope defined by a combined angle theta 708. This may advantageously provide sufficient room to accommodate the rotation of the first link 701 with respect to the second link 702, while also providing a hard stop to limit the rotation once an angle theta 708 is achieved by the flexure in either direction. The hard stop advantageously protects against the fracturing of the hinge 704.

Figure 8:
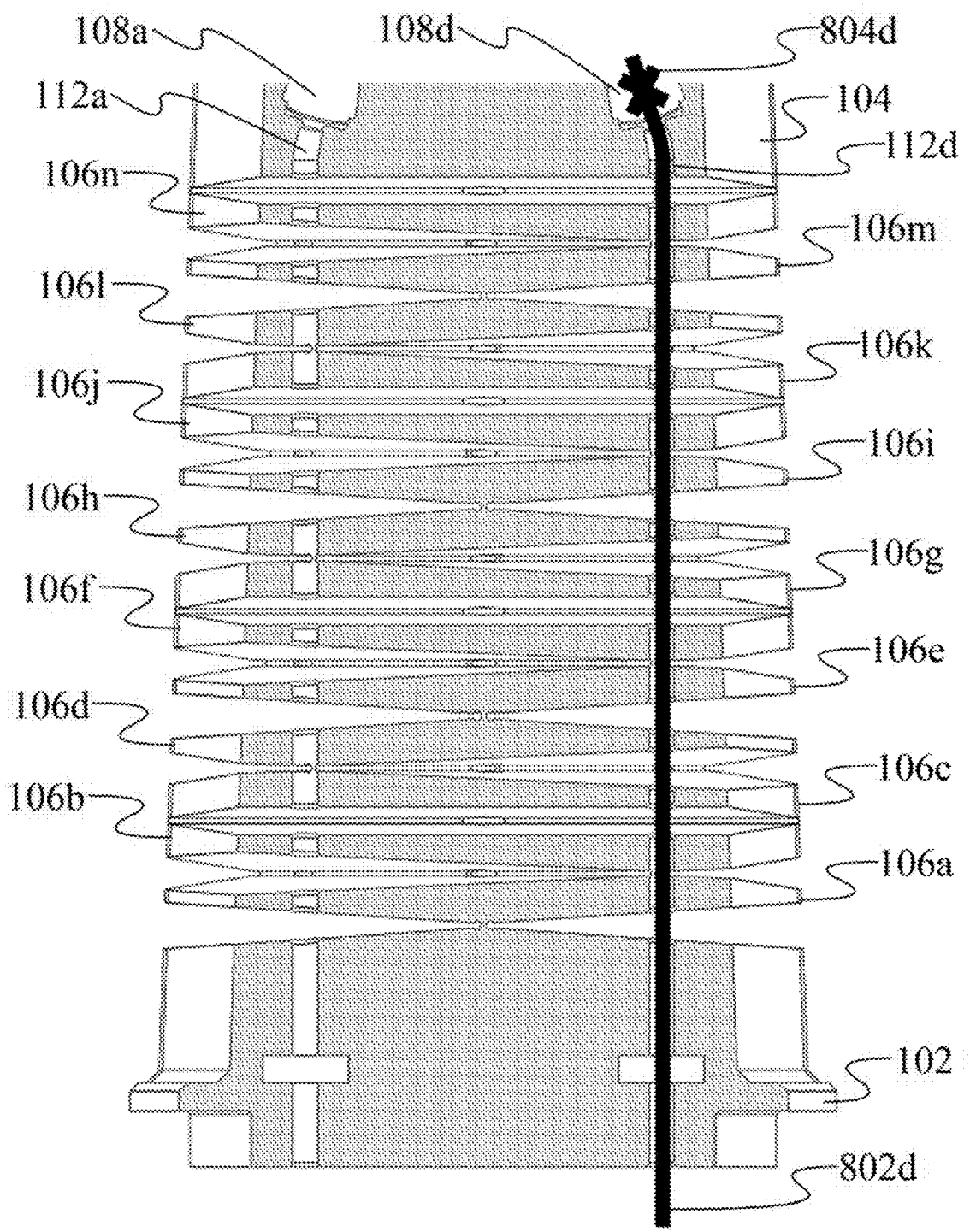
FIG. 8 is cross-sectional view of the flexible mechanical joint of FIGS. 1 and 2 illustrated in an unarticulated configuration, and showing a routing of a cable according to at least one illustrated implementation.

FIG. 8 shows the flexible mechanical joint 100 (FIG. 1), illustrating a cable 802d that extends through cable pass-through-holes 112d, according to at least one illustrated implementation. Cable pass-through-holes 112a and 112d are shown extending through the length of the flexible mechanical joint 100, to cable connection cavities 108a and 108d respectively. The cable 802d runs through cable pass-through-holes 112d in each of the plate links 106 to cable connection cavity 108d where the cable 802d is coupled to the end link 104, for example at a cable tie-point or anchor 804d. Other cables similarly pass through sets of cable pass-through-holes 112a, 112b, and 112c in each of the plate links 106, and attached to cable connection cavities 108a, 108b, and 108c, but are not depicted in FIG. 8 to avoid unnecessary cluttering of the drawings.

Figure 9:
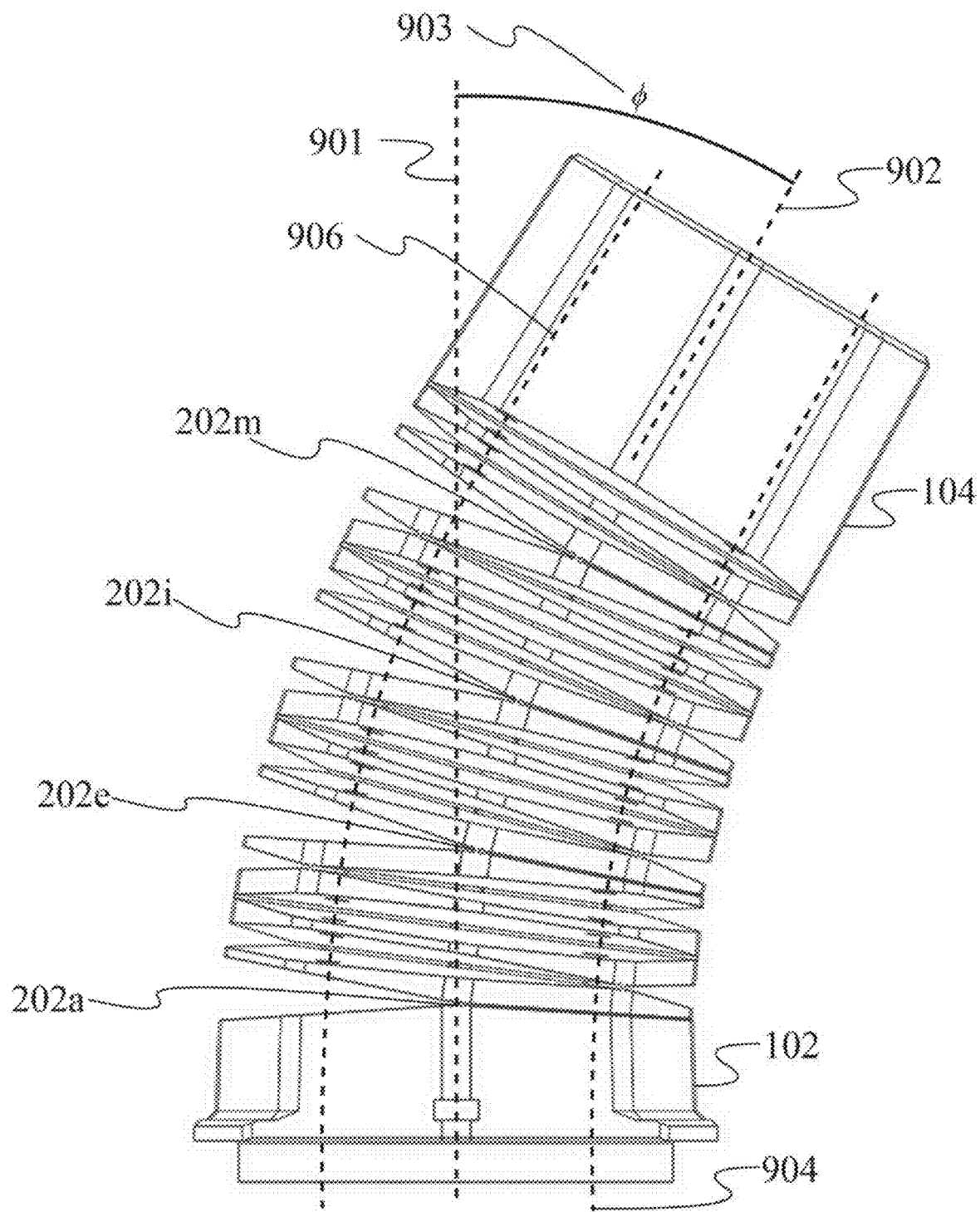
FIG. 9 is a front elevational view of the flexible mechanical joint of FIGS. 1 and 2 illustrated in a first fully articulated configuration.

FIG. 9 shows the flexible mechanical joint 100 (FIG. 1) in an articulated configuration, according to at least one illustrated implementation. The base link 102 has a longitudinal axis 901 and the end link 104 has a longitudinal axis 902. Due to the actuation (e.g., tensioning, movement) of the cables (e.g., cable 802d) extending through the flexible mechanical joint 100, the end link longitudinal axis 902 is pitched away from the base link longitudinal axis 901 by a bend angle 903. The actuation is caused by tensioning and retracting cables (e.g., four cables), thereby creating a shorter pathway 904 on one side of the flexible mechanical joint 100 and relaxing and thereby extending the cables thereby creating a longer pathway 906 on the other side of the flexible mechanical joint 100. This tensioning and relaxing of cables causes flexures having an axis of rotation parallel (or close to parallel) to the intended bend axis to rotate in the bend direction. In this actuation, the flexures having an axis extending parallel to the Z-axis of the flexible mechanical joint 100 (namely 202a, 202e, 202i, and 202m) are the flexures mainly contributing to the bend.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Application Ser. No. 62/943,949, filed Dec. 5, 2019 are incorporated herein by reference, in their entirety. Aspects of the embodiments can be modified, if necessary, to employ systems, circuits and concepts of the various patents, applications and publications to provide yet further embodiments.

The invention claimed is:

1. A flexible joint comprising:
   a plurality of links comprising:
      a base link having a longitudinal axis and at least one cable pass-through-hole;
      a last link having a longitudinal axis and at least one cable tie-point;
      a plurality of intermediate plate links, each having a longitudinal axis and at least one respective cable pass-through hole;
   a plurality of flexures, the base link, the last link, and the plurality of intermediate plate links coupled together by the plurality of flexures such that the plurality of intermediate plate links, the base link, and the last link form a chain of links having the base link at a first end of the chain and the last link at a second end of the chain and each of the plurality of intermediate plate links is coupled to each of two other ones of the plurality of links by respective ones of two flexures, with each respective one of the two flexures at a respective one of two opposite ends of the respective intermediate plate link along the longitudinal axis of the intermediate plate link, the two opposite ends of each intermediate plate link each comprising respective sloped faces that slope towards each other as the intermediate plate link is traversed from an interior to an exterior thereof, wherein each of the flexures has a rotational axis perpendicular to the longitudinal axes of the links that the flexure couples, wherein the rotational axis of each of the flexures extends along a length of the flexure, wherein each of the flexures comprises a flexible hinge member that resiliently couples two of the links;

at least one cable connected to the at least one cable tie-point of the last link and passing through at least one respective cable pass-through-hole of each intermediate link and passing through the cable pass-through hole of the base link; and an inner channel extending longitudinally through the plurality of links and through at least one of the flexures, wherein the rotational axis of the at least one of the flexures is transverse to a longitudinal axis of the inner channel.

2. The flexible joint of claim 1, wherein:

the plurality of flexures comprises at least two sets of flexures, each set of flexures includes a plurality of flexures having parallel rotational axes;

the at least one cable comprises at least two cables; and the at least two cables are routed and coupled to cause the flexible joint to curl in at least two directions in response to tensioning of the at least two cables.

3. The flexible joint of claim 2, wherein:

each of the at least two sets of flexures has a set axis to which all flexures included in said set of flexures are parallel; and the set axes of the at least two sets of flexures are equally distributed around the longitudinal axis of the base link.

4. The flexible joint of claim 3, wherein:

the at least two sets of flexures comprises four sets of flexures; and the set axes of the four sets of flexures are distributed around the longitudinal axis of the base link at 45 degree increments.

5. The flexible joint of claim 1, wherein:

each of the flexures has a different angle of rotation than immediately adjacent flexures.

6. The flexible joint of claim 1, wherein:

a plurality of the intermediate plate links have at least one cable pass-through-hole; and the at least one cable passes through at least one cable pass-through-hole on at least one of the intermediate plate links.

7. A flexible coupling comprising:

a plurality of plates, each plate including a respective first face and a respective second face opposed across a thickness of the plate from the first face, wherein the plates are arranged with respect to one another in a stack;

a number of flexures, wherein for each successive pair of the plates in the stack, a respective one of the flexures comprises a flexible hinge member that resiliently couples the respective pair of the plates to one another for articulation about a respective rotational axis of the flexure, wherein the rotational axis of each of the flexures extends along a length of the flexure, and wherein successive ones of the rotational axes of the flexures along the stack are rotationally offset from a preceding one of the rotational axes of the flexures by a respective angular offset;

at least one cable that extends along the stack between a proximate-most one of the plates and a distal-most one of the plates to apply a force to at least the distal-most one of the plates; and an inner channel extending longitudinally through the plurality of plates and through at least one of the flexures, wherein the rotational axis of the at least one of the flexures is transverse to a longitudinal axis of the inner channel.

8. The flexible coupling of claim 7 wherein the flexures have a same shape as one another at least in an elevational view.

9. The flexible coupling of claim 7 wherein the flexures each have a respective first portion, a respective second portion, and a respective necked portion between the respective first and the respective second portions, the respective first portion integral to one of the plates of the respective pair of the plates that the respective flexure couples and the respective second portion integral to another one of the plates of the respective pair of the plates that the respective flexure couples.

10. The flexible coupling of claim 7 wherein the flexures each have a respective first portion, a respective second portion, and a respective necked portion between the respective first and the respective second portions, the respective first portion a single unitary piece of one of the plates of the respective pair of the plates that the respective flexure couples and the respective second portion a single unitary piece of another one of the plates of the respective pair of the plates that the respective flexure couples.

11. The flexible coupling of claim 7 wherein all of the plates have a same outer perimeter shape as one another at least in a plan view, and successive ones of the plates along the stack are rotationally offset from a preceding one the plates by a respective angular offset.

12. The flexible coupling of claim 11 wherein the plates each have a respective outer perimeter with a respective outer perimeter size, the respective outer perimeter sizes of the plates decreasing from a proximate-most one of the plates to a distal-most one of the plates.

13. The flexible coupling of claim 7 wherein at least two of the plates are identical to one another in outer perimeter shape but not outer perimeter size, and successive ones of the plates along the stack are rotationally offset from a preceding one the plates by a respective angular offset.

14. The flexible coupling of claim 7 wherein successive ones of the plates along the stack are rotationally offset from a preceding one the plates by a respective angular offset, the angular offsets being equal to one another.

15. The flexible coupling of claim 7 wherein each plate includes a plurality of throughholes extending between the first face and the second face, the respective plurality of throughholes of each plate rotationally aligned with one another when the plates are stacked and the plates are rotationally offset from one another, wherein the at least one cable passes through a respective rotationally aligned throughhole of each plate.

16. The flexible coupling of claim 7 wherein the at least one cable comprises four cables, and the plates each have at least four throughholes extending between the first and the second faces, a first one of the throughholes of each of the plates rotationally aligned with one another when the plates are stacked and rotationally offset from one another, a second one of the throughholes of each of the plates rotationally aligned with one another when the plates are stacked and rotationally offset from one another, a third one of the throughholes of each of the plates rotationally aligned with one another when the plates are stacked and rotationally offset from one another, a fourth one of the throughholes of each of the plates rotationally aligned with one another when the plates are stacked and rotationally offset from one another, and a first one of the four cables passes through a respective one of the first one of the throughholes of each of the plates, a second one of the four cables passes through a respective one of the second one of the throughholes of each of the plates, a third one of the four cables passes through a respective one of the third one of the throughholes of each of the plates, and a fourth one of the four cables passes through a respective one of the fourth one of the throughholes of each of the plates.

17. The flexible coupling of claim 16 wherein for each plate, the four throughholes are arranged at 90 degrees to one another about a longitudinal axis of the respective plate, and are spaced radially outward from the longitudinal axis.

18. The flexible coupling of claim 16 wherein each of the four cables has a proximate end and a distal end, the distal end of each of the four cables fixed to the distal-most one of the plates.

19. The flexible coupling of claim 7, further comprising:
a base, wherein at least one of the flexures resiliently couples the proximate-most one of the plates to the base for articulation about a base rotational axis, the base rotational axis rotationally offset from the rotational axis of the proximate-most one of the plates.

20. The flexible coupling of claim 7, further comprising:
an interface to which a head can be coupled, wherein at least one of the flexures resiliently couples the distal-most one of the plates to the interface for articulation about an interface rotational axis, the interface rotational axis rotationally offset from the rotational axis of the distal-most one of the plates.

* * * * *